US 9,602,286 B2

(12) United States Patent
Bae et al.

(10) Patent No.: US 9,602,286 B2
(45) Date of Patent: Mar. 21, 2017

(54) ELECTRONIC DEVICE AND METHOD FOR EXTRACTING ENCRYPTED MESSAGE

(71) Applicant: Samsung Electronics Co., Ltd., Suwon-si, Gyeonggi-do (KR)

(72) Inventors: Hyung-Jin Bae, Pyeongtaek-si (KR); Je-Han Yoon, Seongnam-si (KR); Jeong-Heui Cho, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 89 days.

(21) Appl. No.: 14/265,797

(22) Filed: Apr. 30, 2014

(65) Prior Publication Data
US 2015/0058630 A1  Feb. 26, 2015

(30) Foreign Application Priority Data
Aug. 22, 2013 (KR) .................. 10-2013-0099894

(51) Int. Cl.
| | |
|---|---|
| *H04L 9/08* | (2006.01) |
| *H04L 9/32* | (2006.01) |
| *G06F 21/16* | (2013.01) |
| *G09C 5/00* | (2006.01) |

(52) U.S. Cl.
CPC ............ *H04L 9/3239* (2013.01); *G06F 21/16* (2013.01); *G09C 5/00* (2013.01); *H04L 9/0861* (2013.01); *G06F 2221/2107* (2013.01)

(58) Field of Classification Search
None
See application file for complete search history.

(56) References Cited

U.S. PATENT DOCUMENTS

| | | | |
|---|---|---|---|
| 6,122,403 A * | 9/2000 | Rhoads | G06F 17/30876 382/233 |
| 6,256,417 B1 * | 7/2001 | Takahashi | H04N 19/563 375/E7.212 |
| 6,557,103 B1 | 4/2003 | Boncelet, Jr. et al. | |
| 8,127,137 B2 * | 2/2012 | Levy | G06Q 20/401 348/509 |
| 2005/0132196 A1 | 6/2005 | Dietl | |
| 2005/0169496 A1 * | 8/2005 | Perry | G06F 21/10 382/100 |
| 2006/0028689 A1 * | 2/2006 | Perry | H04N 1/32144 358/3.28 |
| 2007/0005977 A1 * | 1/2007 | Tohne | H04N 1/32203 713/176 |
| 2008/0069340 A1 | 3/2008 | Vaughn | |
| 2009/0022360 A1 * | 1/2009 | Bradley | G10L 19/018 382/100 |
| 2011/0176706 A1 * | 7/2011 | Levy | G06Q 20/401 382/100 |
| 2014/0170620 A1 * | 6/2014 | Savitsky | A61B 8/466 434/262 |

* cited by examiner

*Primary Examiner* — Michael R Vaughan
(74) *Attorney, Agent, or Firm* — Jefferson IP Law, LLP

(57) ABSTRACT

A method of an electronic device is provided. The method includes generating a key code by receiving a selection on at least one area from among areas of an image displayed, decrypting an encrypted message included in the image by using the generated key code, and determining whether to output the encrypted message by determining whether a hash code for the decrypted message is identical to a hash code for inputted text information.

12 Claims, 10 Drawing Sheets

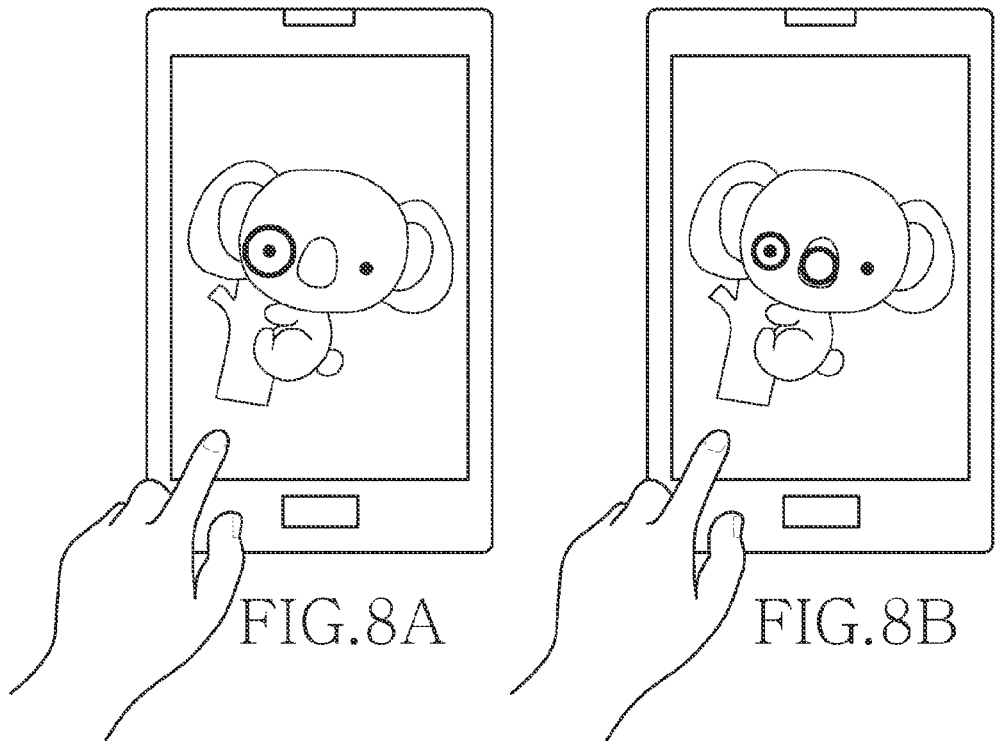
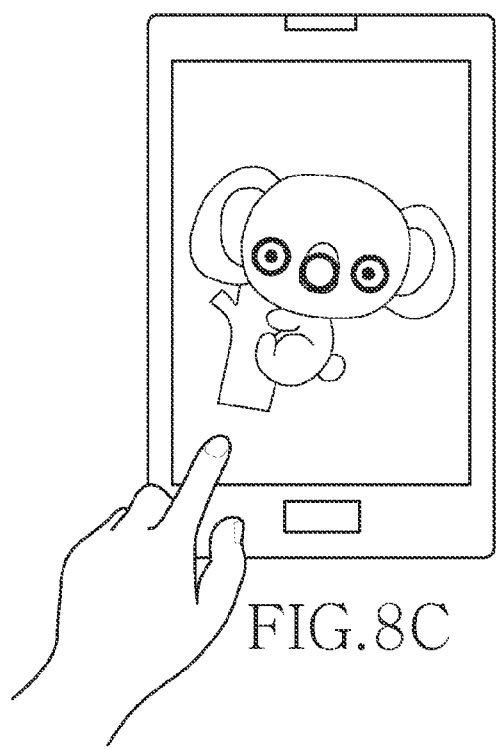

ELECTRONIC DEVICE AND METHOD FOR EXTRACTING ENCRYPTED MESSAGE

CROSS-REFERENCE TO RELATED APPLICATION(S)

This application claims the benefit under 35 U.S.C. §119(a) of a Korean patent application filed on Aug. 22, 2013 in the Korean Intellectual Property Office and assigned Serial number 10-2013-0099894, the entire disclosure of which is hereby incorporated by reference.

TECHNICAL FIELD

The present disclosure relates to an electronic device and method for extracting an encrypted message.

BACKGROUND

As functions of an electronic device evolve, after important information is inserted into an image file in a way other people cannot notice, a message inserted into the image file may be extracted if necessary. For example, after inserting important information into an electronic file through watermark technique, a user may extract the inserted information by using the electronic device.

However, user-friendly extraction methods have not been developed. For example, in an electronic device according to the related art, a set password needs to be entered or unique information of an electronic device is required in order to extract a message inserted into an image file.

Therefore, a need exists for methods of extracting unique information stored in an image that ensure security (e.g., important information stored in an image is not easily exposed) and that are user-friendly.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a device and method for providing a user-friendly decoding way with improved security by confirming a message inserted into an image when a set area of an image is inputted according to a set order.

Another aspect of the present disclosure is to provide a device and method for improving security and user convenience by easily storing important information with a simple setting of a touch area and a touch order when predetermined information is stored in an image.

In accordance with an aspect of the present disclosure, an operating method of an electronic device is provided. The operating method includes generating a key code by receiving a selection on at least one area from among areas of an image displayed, decrypting an encrypted message included in the image by using the generated key code, and determining whether to output the encrypted message by determining whether a hash code for the decrypted message is identical to a hash code for inputted text information.

In accordance with another aspect of the present disclosure, the method may further include receiving a selection on at least one area from among areas of the image, generating a key code according to a coordinate of the selected area and a selected order, and generating the encrypted message according to a set encryption algorithm by using the generated key code and the inputted text information.

In accordance with another aspect of the present disclosure, the method may further include generating a hash code for the inputted text information, and inserting the encrypted message and the hash code for the inputted text information into the image through a watermark.

In accordance with another aspect of the present disclosure, the generating of the key code by receiving the selection on the at least one area from among the areas of the image displayed may include receiving a selection on at least one area from among areas of the image, and generating a key code according to a coordinate of the selected area and a selected order of the at least one area.

In accordance with another aspect of the present disclosure, the decrypting of the encrypted message included in the image by using the generated key code may include decrypting the encrypted message according to a set decryption algorithm by using the generated key code and the decrypted message included in the image.

In accordance with another aspect of the present disclosure, the method may further include generating a hash code for the decrypted message.

In accordance with another aspect of the present disclosure, the determining of whether to output the encrypted message by determining whether the hash code for the decrypted message is identical to the hash code for the inputted text information may include determining that the hash code for the decrypted message is not identical to the hash code for the inputted text information, and displaying a message that the encrypted message cannot be displayed.

In accordance with another aspect of the present disclosure, the determining of whether to output the encrypted message by determining whether the hash code for the decrypted message is identical to the hash code for the inputted text information may include determining that the hash code for the decrypted message is not identical to the hash code for the inputted text information, and outputting a message that the encrypted message cannot be outputted as voice.

In accordance with another aspect of the present disclosure, the determining of whether to output the encrypted message by determining whether the hash code for the decrypted message is identical to the hash code for the inputted text information may include determining that the hash code for the decrypted message is identical to the hash code for the inputted text information, and displaying the encrypted message.

In accordance with another aspect of the present disclosure, the determining of whether to output the encrypted message by determining whether the hash code for the decrypted message is identical to the hash code for the inputted text information may include determining that the hash code for the decrypted message is identical to the hash code for the inputted text information, and outputting the encrypted message as voice.

In accordance with another aspect of the present disclosure, an electronic device is provided. The electronic device includes a processor configured to generate a key code by receiving a selection on at least one area from among areas of an image displayed, to decrypt an encrypted message included in the image by using the generated key code, and to determine whether to output the encrypted message by determining whether a hash code for the decrypted message is identical to a hash code for inputted text information, and a memory configured to store data controlled by the processor.

In accordance with another aspect of the present disclosure, the device may further include a display module configured to receive a selection on at least one area from among areas of the image, wherein the processor is further configured to generate a key code according to a coordinate of the selected area and a selected order of the at least one area, and to generate the encrypted message according to a set encryption algorithm by using the generated key code and the inputted text information.

In accordance with another aspect of the present disclosure, the processor may is further configured to generate a hash code for the inputted text information and to insert the encrypted message and the hash code for the inputted text information into the image through a watermark.

In accordance with another aspect of the present disclosure, the device may further include a display module configured to receive a selection on at least one area from among areas of the image, wherein the processor is further configured to generate a key code according to a coordinate of the selected area and a selected order of the at least one area.

In accordance with another aspect of the present disclosure, the processor may be further configured to decrypt the encrypted message according to a set decryption algorithm by using the generated key code and the decrypted message included in the image.

In accordance with another aspect of the present disclosure, the processor may generate a hash code for the decrypted message.

In accordance with another aspect of the present disclosure, the device may further include a display module, wherein the processor may be further configured to operatively control the display module to display a message that the encrypted message cannot be outputted if the processor determines that the hash code for the decrypted message is not identical to the hash code for the inputted text information.

In accordance with another aspect of the present disclosure, the device may further include a speaker, wherein the processor may be further configured to operatively control the speaker to output a message that the encrypted message cannot be outputted as voice if the processor determines that the hash code for the decrypted message is not identical to the hash code for the inputted text information.

In accordance with another aspect of the present disclosure, the device may further include a display module, wherein the processor may be further configured to operatively control the display module to display the encrypted message if the processor determines that the hash code for the decrypted message is not identical to the hash code for the inputted text information.

In accordance with another aspect of the present disclosure, the device may further include a speaker, wherein processor may be further configured to operatively control the speaker to output the encrypted message as voice if the processor determines that the hash code for the decrypted message is not identical to the hash code for the inputted text information.

In accordance with another aspect of the present disclosure, a method of encrypting data in an electronic device is provided. The method includes receiving data to be encrypted, receiving at least one encryption input to an image being displayed by the electronic device, generating an encryption key according to respective locations of the at least one encryption input in relation to the image, encrypting the data using the encryption key, and multiplexing the encrypted data with the image.

In accordance with another aspect of the present disclosure, a method of decrypting data in an electronic device is provided. The method includes receiving at least one decryption input to an image being displayed by the electronic device, generating a decryption key according to respective locations of the at least one decryption input in relation to the image, decrypting encrypted data multiplexed with the image using the decryption key, and determining whether to output the encrypted data based on the decrypted data.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIGS. 8A, 8B and 8C are views of displaying a portion selected when a displayed image is selected through an electronic device according to an embodiment of the present disclosure.

Throughout the drawings, like reference numerals will be understood to refer to like parts, components, and structures.

DETAILED DESCRIPTION

Figure 1:
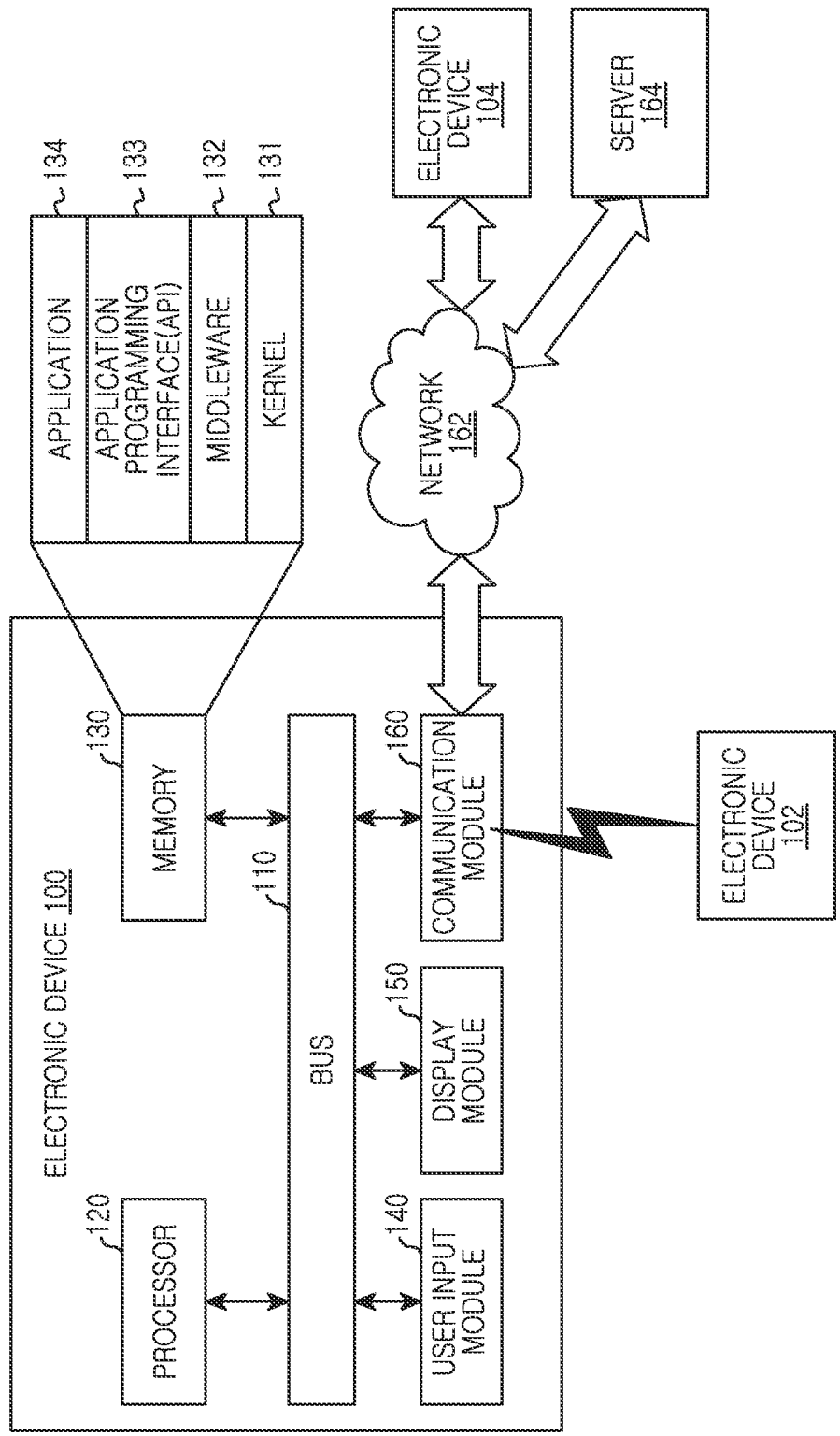
FIG. 1 is a block diagram illustrating an electronic device according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary.

Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

An electronic device according to an embodiment of the present disclosure may be a device having a communication function. For example, the electronic device may be a combination including at least one of a smartphone, a tablet Personal Computer (PC), a mobile phone, a video phone, an e-book reader, a desktop PC, a laptop PC, a netbook computer, Personal Digital Assistant (PDA), a Portable Multimedia Player (PMP), an MP3 player, a mobile medical device, an electronic bracelet, an electronic necklace, an electronic necklace, an electronic appcessory, a camera, a wearable device, an electronic clock, a wrist watch, smart white appliance (e.g., a refrigerator, an air conditioner, a vacuum cleaner, an artificial intelligence robot, a TV, a Digital Video Disk (DVD) player, an audio system, an oven, a microwave, a washing machine, an air purifier, and a digital photo frame), various medical devices (e.g., Magnetic Resonance Angiography (MRA), Magnetic Resonance Imaging (MRI), Computed Tomography (CT), tomography, and ultrasonograph, a navigation device, a Global Positioning System (GPS) receiver, an Event Data Recorder (EDR), a Flight Data Recorder (FDR), a set-top box, a TV box (e.g., Samsung HomeSync™, Apple TV™, or a Google TV™), an electronic dictionary, a vehicle infotainment device, electronic equipment for ship (e.g., a navigation device for ship and a gyro compass), avionics, a security device, an electronic garment, an electronic key, a camcorder, a game console, Head-Mounted Display (HMD), a flat panel display device, an electronic album, part of a furniture or building/structure including a communication function, an electronic board, an electronic signature receiving device, and a projector. It is apparent to those skilled in the art that the electronic device is not limited to the above-mentioned devices.

FIG. 1 is a block diagram illustrating an electronic device according to an embodiment of the present disclosure.

Referring to FIG. 1, the electronic device 100 includes a bus 110, a processor 120, a memory 130, a user input module 140, a display module 150, and a communication module 160.

The bus 110 may be a circuit connecting the above-mentioned components to each other and delivering a communication (e.g., a control message) therebetween.

The processor 120 receives a command from the above other components (e.g., the memory 130, the user input module 140, the display module 150, and the communication module 160) through the bus 110, interprets the received command, and performs operations and data processing in response to the interpreted command.

The memory 130 may store commands or data received from or generated by the processor 120 or the above other components (e.g., user input module 140, the display module 150, and the communication module 160). The memory 130 may include programming modules, for example, a kernel 131, a middleware 132, an application programming interface 133, and an application 134. Each of the above-mentioned programming modules may be configured with software, firmware, hardware, or a combination thereof.

The kernel 131 may control or manage system resources (e.g., the bus 110, the processor 120, or the memory 130) used for performing operation or functions implemented by the remaining other programming modules, for example, the middleware 132, the API 133, and/or the application 134. Additionally, the kernel 131 may provide an interface for accessing an individual component of the electronic device 100 from the kernel 131, the middleware 132, the API 133, or the application 134 and controlling or managing such an individual component.

The middleware 132 may serve as an intermediary role for exchanging data between the API 133 or the application 134 and the kernel 131 through communication. Additionally, in relation to job requests received from a plurality of applications 134, the middleware 132 may perform a load balancing on the job requests by using a method of assigning a priority for using a system resource (e.g., the bus 110, the processor 120, or the memory 130) to at least one application among the plurality of applications 134.

The API 133, as an interface through which the application 134 controls a function provided from the kernel 131 or the middleware 132, may include at least one interface or function for file control, window control, image processing, character control, and/or the like.

The user input module 140 may receive commands or data from a user and delivers the commands to the processor 120 or the memory 130 via the bus 110.

The display module 150 may display images, video, data, and/or the like to a user.

The communication module 160 may connect a communication between another electronic device 102 and the electronic device 100. The communication module 160 may operatively connect a communication between the electronic device 100 and an electronic device 104, a server 164, and/or the like. The communication module 160 may support a predetermined short range communication protocol (e.g., Wireless Fidelity (WiFi), BlueTooth (BT), Near Field Communication (NFC), and/or the like) or a predetermined network communication 162 (e.g., Internet, Local Area Network (LAN), Wire Area Network (WAN), telecommunication network, cellular network, satellite network or Plain Old Telephone Service (POTS), and/or the like). The other electronic device 102 and/or electronic device 104 may be identical to (e.g., the same type) or different from (e.g., a different type) the electronic device 100.

Figure 2:
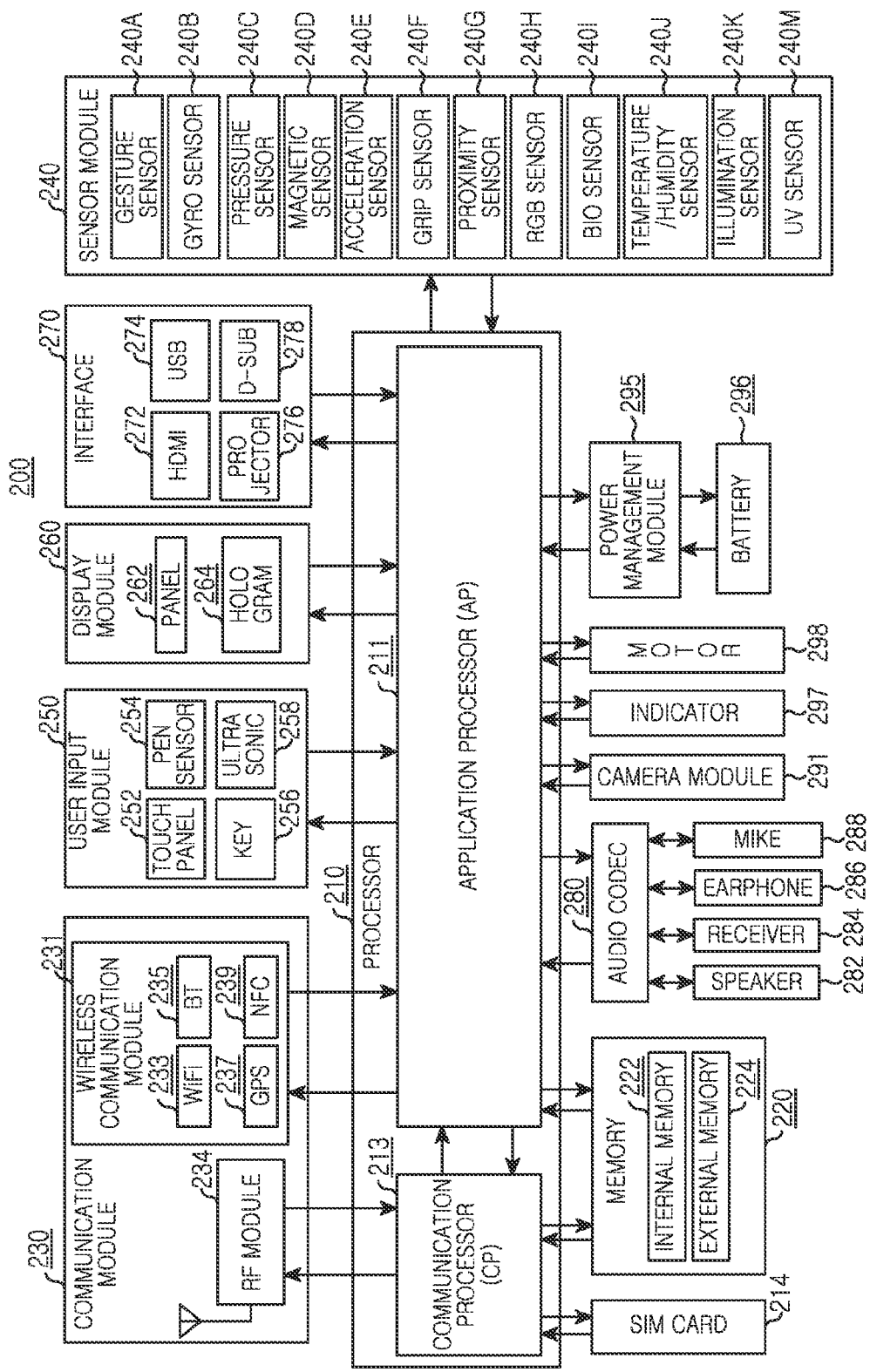
FIG. 2 is a bock diagram of hardware according to an embodiment of the present disclosure.

FIG. 2 is a block diagram illustrating hardware according to an embodiment of the present disclosure. According to various embodiments of the present disclosure, as an example, the hardware 200 may correspond to the electronic device 100 illustrated in FIG. 1.

Referring to FIG. 2, the hardware 200 includes at least one processor 210, a Subscriber Identification Module (SIM) card 214, a memory 220, a communication module 230, a sensor module 240, a user input module 250, a display module 260, an interface 270, an audio codec 280, a camera module 291, a power management module 295, a battery 296, an indicator 297, a motor 298, and/or the like.

The processor 210 (e.g., the processor 120) may include at least one Application Processor (AP) 211 and/or at least one Communication Processor (CP) 213. As an example, the processor 210 may correspond to the processor 120 illustrated in FIG. 1. Although the AP 211 and the CP 213 included in the processor 210 are illustrated in FIG. 2, the AP 211 and/or the CP 213 may be included in different IC packages. According to various embodiments of the present disclosure, the AP 211 and the CP 213 may be included in one IC package.

According to various embodiments of the present disclosure, the processor 210 may be configured with a first processor and a second processor. The first processor may determine whether a state change occurs by using at least one equipped sensor. If the first processor determines that a state change occurs, then the first processor may determine whether to transmit the state information to the second processor. Additionally, the first processor may determine whether at least one change occurs among position changes, altitude changes, temperature changes, pressure changes, humidity changes, illumination changes, pressure changes, and/or the like which exceed a predetermined numerical value, by using at least one sensor connected to the first processor. Additionally, the first processor may detect that a state change switches from a state of more than a predetermined numerical value into a state of less than a predetermined numerical value by using at least one sensor connected to the first processor. Additionally, the first processor may detect that a state change switches from a state of more than a predetermined numerical value into a state of less than a predetermined numerical value by using at least one sensor connected to the first processor and then may determine to transmit the state information to the second processor. Additionally, the first processor may operate with a power of less than a predetermined value.

The second processor may determine whether to measure a changed position at each set period by using a provided positioning module according to whether the state information is received. Additionally, if the state information is not received, the second processor may not measure the position even when the next position measuring period, at which a position measuring module starts to measure the position, arrives. Additionally, upon receiving the state information, the second processor confirms the next position measuring period for starting to measure the position by using the position measuring module, confirms that the next position measuring period for starting to measure the position by using the position measuring module arrives, and measures a changed position at the next position measuring period by using the position measuring module. Moreover, the second processor may read the state information from the first processor and may confirm the read state information when the next position measuring period arrives. Moreover, the second processor may be in one of a wakeup state and a sleep state.

The AP 211 may control a plurality of hardware and/or software components connected to the AP 211 by executing an operating system and/or an application program and may perform various data processing and operations with multimedia data. As an example, the AP 211 may be implemented with System on Chip (SoC). According to various embodiments of the present disclosure, the processor 210 may further include a Graphic Processing Unit (GPU) (not shown).

The CP 213 may manage a data link in a communication between an electronic device (e.g., the electronic device 100) including the hardware 200 and other electronic devices connected via a network, and may convert a communication protocol. As an example, the CP 213 may be implemented with SoC. According to various embodiments of the present disclosure, the CP 213 may perform at least part of a multimedia control function. The CP 213 may perform a distinction and authentication of a terminal in a communication network. For example, the CP 213 may perform a distinction and authentication of a terminal in a communication network by using a subscriber identification module (e.g., the SIM card 214). Additionally, the CP 213 may provide services, for example, a voice call, a video call, a text message, packet data, and/or the like, to a user.

Additionally, the CP 213 may control data transmission of the communication module 230. As illustrated in FIG. 2, components such as the CP 213, the power management module 295, or the memory 220 are separated from the AP 211. However, according to various embodiments of the present disclosure, the AP 211 may be implemented including some of the above-mentioned components (e.g., the CP 213).

According to various embodiments of the present disclosure, the AP 211 or the CP 213 may load commands and/or data, which are received from a nonvolatile memory or at least one of other components connected thereto, into a volatile memory and may process such commands and/or data. Furthermore, the AP 211 or the CP 213 may store data received from or generated by at least one of other components in a nonvolatile memory.

The SIM card 214 may be a card implementing a subscriber identification module and may be inserted into a slot formed at a specific position of an electronic device. The SIM card 214 may include unique identification information (e.g., an Integrated Circuit Card IDentifier (ICCID) or subscriber information (e.g., an International Mobile Subscriber Identity (IMSI)).

The memory 220 may include an internal memory 222 or an external memory 224. As an example, the memory 220 may correspond to the memory 130 illustrated in FIG. 1. The internal memory 222 may include at least one of a volatile memory (e.g., Dynamic RAM (DRAM), Static RAM (SRAM), Synchronous Dynamic RAM (SDRAM), and/or the like) and a non-volatile memory (e.g., One Time Programmable ROM (OTPROM), Programmable ROM (PROM), Erasable and Programmable ROM (EPROM), Electrically Erasable and Programmable ROM (EEPROM), mask ROM, flash ROM, NAND flash memory, NOR flash memory, and/or the like) According to various embodiments of the present disclosure, the internal memory 222 may have a form of Solid State Drive (SSD). The external memory 224 may further include Compact Flash (CF), Secure Digital (SD), Micro Secure Digital (Micro-SD), Mini Secure Digital (Mini-SD), extreme Digital (xD), or memory stick. According to various embodiments of the present disclosure, the memory 220 may store information on a state switching into a state of less than a predetermined numerical value.

The communication module 230 may include a wireless communication module 231 and/or an RF module 234. As an example, the communication module 230 may correspond to the communication module 160 illustrated in FIG. 1. The wireless communication module 231 may include a WiFi 233 module, BT 235 module, a GPS 237 module, or a NFC 239 module. For example, the wireless communication module 231 may provide a wireless communication function by using a wireless frequency. Additionally or alternatively, the wireless communication module 231 may include a network interface (e.g., a LAN card) and/or a modem for connecting the hardware 200 to a network (e.g., Internet, LAN, WAN, telecommunication network, cellular network, satellite network, POTS and/or the like).

The RF module 234 may be responsible for data transmission, for example, the transmission of an RF signal or a called electrical signal. Although not shown in the drawings, the RF module 234 may include a transceiver, a Power Amp Module (PAM), a frequency filter, a Low Noise Amplifier (LNA), and/or the like. The RF module 234 may further include components for transmitting/receiving electromagnetic waves on free space in a wireless communication, for example, conductors or conducting wires.

The sensor module 240 may include at least one of a gesture sensor 240A, a gyro sensor 240B, a pressure sensor 240C, a magnetic sensor 240D, an acceleration sensor 240E, a grip sensor 240F, a proximity sensor 240G, a Red, Green, Blue (RGB) sensor 240H, a bio sensor 240I, a temperature/humidity sensor 240J, an illumination sensor 240K, a Ultra Violet (UV) sensor 240M, and/or the like. The sensor module 240 measures physical quantities or detects an operating state of an electronic device, thereby converting the measured or detected information into electrical signals. Additionally/alternately, the sensor module 240 may include an E-nose sensor (not shown), an ElectroMyoGraphy (EMG) sensor, an ElectroEncephaloGram (EEG) sensor (not shown), or an ElectroCardioGram (ECG) sensor (not shown). The sensor module 240 may further include a control circuit for controlling at least one sensor therein.

The user input module 250 may include a touch panel 252, a (digital) pen sensor 254, a key 256, an ultrasonic input device 258, and/or the like. As an example, the user input module 250 may correspond to the user input module 140 illustrated in FIG. 1. As an example, the touch panel 252 may recognize a touch input through at least one of a capacitive, resistive, infrared, or ultrasonic method. Additionally, the touch panel 252 may further include a controller (not shown). In the case of the capacitive method, both direct touch and proximity recognition are possible. The touch panel 252 may further include a tactile layer. If the touch panel includes a tactile layer, the touch panel 252 may provide a tactile response to a user.

The (digital) pen sensor 254 may be implemented through a method similar or identical to that of receiving a user touch input or an additional sheet for recognition. As an example, a keypad or a touch key may be implemented as the key 256. The ultrasonic input device 258, as a device confirming data by detecting sound waves through a microphone (e.g., the mike 288) in a terminal, may provide wireless recognition through a pen generating ultrasonic signals. According to various embodiments of the present disclosure, the hardware 200 may receive a user input from an external device (e.g., a network, a computer, or a server) connected to the hardware 200 through the communication module 230.

The display module 260 may include a panel 262 and/or a hologram 264. As an example, the display module 260 may correspond to the display module 150 illustrated in FIG. 1. The panel 262 may include a Liquid-Crystal Display (LCD), an Active-Matrix Organic Light-Emitting Diode (AMOLED), and/or the like. As an example, the panel 262 may be implemented to be flexible, transparent, and/or wearable. The panel 262 and the touch panel 252 may be configured with one module. The hologram 264 may show three-dimensional images (e.g., in the air) by using the interference of light. According to various embodiments of the present disclosure, the display module 260 may further include a control circuit to control the panel 262 and/or the hologram 264.

The interface 270 may include a High-Definition Multimedia Interface (HDMI) 272, a Universal Serial Bus (USB) 274, a projector 276, or a D-subminiature (sub) 278. Additionally or alternately, the interface 270 may include a SD/Multi-Media Card (MMC) (not shown), an Infrared Data Association (IrDA) (not shown), and/or the like.

The audio codec 280 may convert voice into electrical signal and vice versa. The audio codec 280 may convert voice information inputted through or outputted from a speaker 282, a receiver 284, an earphone 286, or a mike 288.

According to various embodiments of the present disclosure, the camera module 291, as a device for capturing an image and video, may include at least one image sensor (e.g., a front lens or a rear lens), an image Signal Processor (SP) (not shown), a flash LED (not shown), and/or the like.

The power management module 295 may manage the power of the hardware 200. Although not shown in the drawings, the power management module 295 may include a Power Management Integrated Circuit (PMIC), a charger Integrated Circuit (IC), a battery fuel gauge, and/or the like.

As an example, PMIC may be built in an IC or SoC semiconductor. A charging method may be classified as a wired method and a wireless method. The charger IC may charge a battery and may prevent overvoltage and/or overcurrent flow from charger. According to various embodiments of the present disclosure, the charger IC may include a charger IC component for at least one of the wired charging method and the wireless charging method. As an example, the wireless charging method may include or otherwise correspond to a magnetic resonance method, a magnetic induction method, an electromagnetic method, and/or the like. As an example, the charger IC may include additional circuit for wireless charging, for example, a circuit such as a coil loop, a resonant circuit, a rectifier circuit, and/or the like.

A battery gauge may measure the remaining amount of the battery 296, or a voltage, current, or temperature thereof during charging. The battery 296 may generate electricity and supplies power. For example, the battery 296 may be a rechargeable battery.

The indicator 297 may display a specific state of the hardware 200 or part thereof (e.g., the AP 211), for example, a booting state, a message state, a charging state, and/or the like. The motor 298 may convert electrical signals into mechanical vibration. The MCU 299 may control the sensor module 240.

Although not shown in the drawings, the hardware 200 may include a processing device (e.g., a GPU) for mobile TV support. The processing device for mobile TV support may process media data according to the standards such as Digital Multimedia Broadcasting (DMB), Digital Video Broadcasting (DVB), media flow, and/or the like.

The names of the above-mentioned components in hardware according to various embodiments of the present disclosure may vary according to types of an electronic device. Hardware according to various embodiments of the present disclosure may be configured including at least one of the above-mentioned components or additional other components. Additionally, some of components in hardware according to various embodiments of the present disclosure may be configured as one entity, so that functions of previous corresponding components are performed identically.

Figure 3:
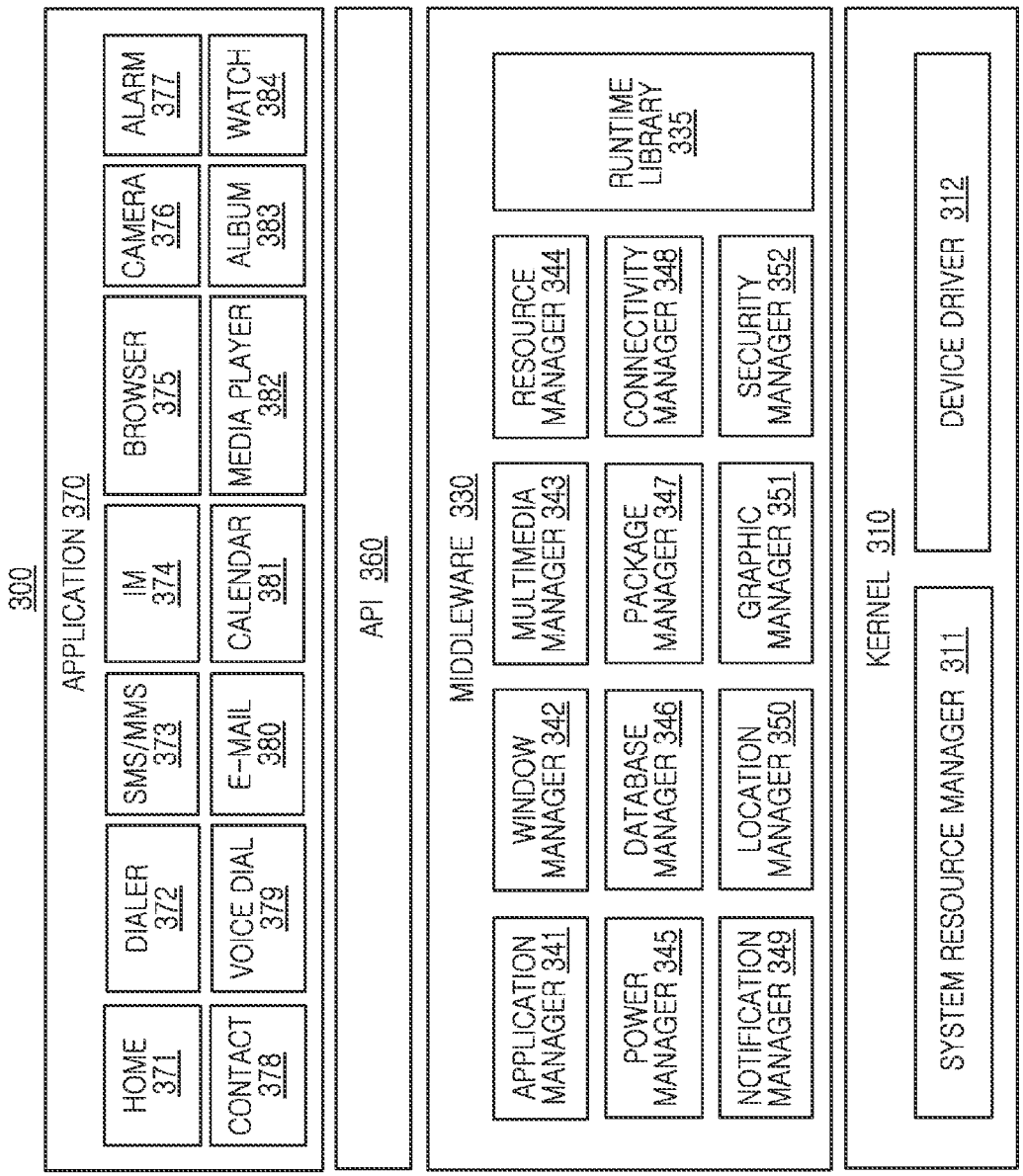
FIG. 3 is a block diagram illustrating a programming module according to an embodiment of the present disclosure.

FIG. 3 is a block diagram illustrating a programming module according to an embodiment of the present disclosure.

Referring to FIG. 3, a programming module 300 may include a kernel 310, a middleware 330, an Application Programming Interface (API) 360, and/or an application 370.

The programming module 300 may be included (e.g., stored) in the electronic device 100 (e.g., the memory 130) of FIG. 1. At least part of the programming module 300 may be configured with software, firmware, hardware, or a combination thereof. The programming module 300 may include an Operating System (OS) controlling a resource relating to an electronic device (e.g., the electronic device 100) implemented in hardware (e.g., the hardware 200) or various applications (e.g., the application 370) running on the OS. For example, the OS may include Android, iOS, Windows, Symbian, Tizen, Bada, and/or the like.

The kernel 310 (e.g., the kernel 131) may include a system resource manager 311 and/or a device driver 312. As an example, although not illustrated in FIG. 3, the system resource manager 311 may include a process management unit, a memory management unit, a file system management unit, and/or the like. The system resource manager 311 may perform control, allocation, and/or recovery of a system resource. As an example, although not illustrated in FIG. 3, the device driver 312 may include a display driver, a camera driver, a Bluetooth driver, a sharing memory driver, a USB driver, a keypad driver, a keypad driver, a WiFi driver, an audio driver, and/or the like. Additionally, according to various embodiments of the present disclosure, the device driver 312 may include an Inter-Processing Communication (IPC) driver (not shown).

The middleware 330 may include a plurality of pre-implemented modules for providing functions that the application 370 commonly requires. Additionally, the middleware 330 may provide functions through the API 360 to allow the application 370 to efficiently use a limited system resource in an electronic device. For example, as illustrated in FIG. 3, the middleware 330 (e.g., the middleware 132) may include at least one of a runtime library 335, an application manager 341, a window manager 342, a multimedia manager 343, a resource manager 344, a power manager 345, a database manager 346, a package manager 347, a connectivity manager 348, a notification manager 349, a location manager 350, a graphic manager 351, a security manager 352, and/or the like.

The runtime library 335 may include a library module in which a compiler is used to add a new function through programming language while the application 370 is executed. According to various embodiments of the present disclosure, the runtime library 335 may perform functions relating to an input/output, memory management, calculation operation, and/or the like.

The application manager 341 may manage a life cycle of at least one application among the applications 370. The window manager 342 may manage a GUI resource using a screen.

The multimedia manager 343 may recognize a format necessary for playing various media files and may perform encoding or decoding on a media file by using codec appropriate for a corresponding format.

The resource manager 344 may manage a resource such as source code, memory, or storage space of at least one application among the applications 370.

The power manager 345 manages a battery or power in operation with Basic Input/Output System (BIOD) and provides power information necessary for an operation.

The database manager 346 may perform a management operation to generate, search, and/or change a database used for at least one application among the applications 370.

The package manager 347 may manage the installation and/or update of an application distributed in a package file format.

The connectivity manager 348 may manage a wireless connection such as WiFi, Bluetooth, and/or the like.

The notification manager 349 may display and/or notify events such as arrival messages, appointments, proximity alerts, and/or the like in a manner that is not disruptive to a user.

The location manager 350 may manage location information of an electronic device.

The graphic manager 351 may manage a graphic effect to be provided to a user or a user interface relating thereto.

The security manager 352 may provide a general security function necessary for system security or user authentication.

According to various embodiments of the present disclosure, when an electronic device (e.g., the electronic device 100) has a call function, the middleware 330 may further include a telephony manager (not shown) for managing a voice or video call function of the electronic device.

The middleware 330 may generate and use a new middleware module through various function combinations of the above-mentioned internal component modules. The middleware 330 may provide modules specified according to types of OS so as to provide distinctive functions. Additionally, the middleware 330 may delete some of existing components and/or add new components dynamically. According to various embodiments of the present disclosure, some of the components listed may be omitted, other components may be added, and/or components having different names and performing similar functions may be substituted.

The API 360 (e.g., the API 133) may be provided as a set of API programming functions with a different configuration according OS. According to various embodiments of the present disclosure, in the case of Android or iOS, for example, one API set may be provided by each platform, and in the case of Tizen, for example, more than two API sets may be provided.

The application 370 (e.g., the application 134), for example, may include a preloaded application or a third part application.

At least part of the programming module 300 may be implemented using a command stored in a non-transitory computer-readable storage media. When the command is executed by at least one processor (e.g., the processor 210), the at least one processor may perform a function corresponding to the command. As an example, the non-transitory computer-readable storage media may include the memory 260. As an example, at least part of the programming module 300 may be implemented (e.g., executed) by the processor 210. As an example, at least part of the programming module 300 may include a module, a program, a routine, sets of instructions, or a process to perform at least one function.

According to various embodiments of the present disclosure, names of components of a programming module (e.g., the programming module 300) may vary according to types of OS. Additionally, according to various embodiments of the present disclosure, a programming module may be configured including at least one of the above-mentioned components or additional other components.

According to various embodiments of the present disclosure, the electronic device may include a first processor, a second processor, a plurality of sensors, and a position measuring module.

First, the plurality of sensors may detect a state change of the electronic device. More specifically, the plurality of sensors may detect a change in state of the electronic device. The plurality of sensors may include motion sensors such as an acceleration sensor, a gyroscope sensor, a magnetic sensor, and/or the like. Additionally or alternatively, the plurality of sensors may be gesture sensors including a proximity sensor and an infrared ray sensor. Additionally, the plurality of sensors may be light sensors including an ambient light sensor, an ultra violet sensor, and an illumination sensor.

Additionally or alternatively, the plurality of sensors may be environment sensors including a temperature humidity sensor, a volatile organic compounds sensor, a carbon dioxide sensor, and/or the like. Additionally or alternatively, the plurality of sensor may be atmospheric pressure sensors including a barometer, an altimeter, and/or the like. Additionally or alternatively, the plurality of sensors may be touch pressure sensors including a strain gauge sensor, a pressure sensor, a fingerprint sensor, and/or the like.

The first processor may determine whether a state change in an electronic device occurs by using the plurality of sensors connected to the first processor. More specifically, the first processor determines whether at least one change exists among position changes, altitude changes, temperature changes, pressure changes, humidity changes, illumination changes, and pressure changes, and/or the like which exceed a predetermined numerical value, by using the plurality of sensors connected to the first processor.

According to various embodiments of the present disclosure, if a state change is determined to have occurred in the electronic device, the first processor may determine whether to transmit state information to the second processor. More specifically, even when a state change in the electronic device is determined to have occurred, the first processor may determine whether to store the state information or whether to transmit the state information to the second processor.

For example, when the first processor detects that a state change switches from a state of more than a predetermined numerical value into a state of less than a predetermined numerical value by using the plurality of sensors connected to the first processor, the first processor may store state information on switching into a state of less than a numerical value set by the first processor. However, when the first processor detects that a state change switches from a state of less than a predetermined numerical value into a state of more than a predetermined numerical value by using the plurality of sensors connected to the first processor, the first processor may determine to transmit state information to the second processor.

According to various embodiments of the present disclosure, when a changed state of the electronic device switches into a state of less than a set numerical value, because the first processor substantially determines that a position change does not exist, measuring a position change of the electronic device by using the second processor is unnecessary. However, when a changed state of the electronic device switches into a state of more than a set numerical value, the first processor may determine to transmit state information to the second processor so as to allow the second processor to measure a changed position of the electronic device.

The second processor may determine whether to measure a changed position at each set period by using the position measuring module connected to the second processor on the basis of whether the state information is received from the first processor.

First, if the state information is not received from the first processor, the second processor may not measure a position even when the next position measuring period at which the position measuring module connected to the second processor starts to measure a position arrives. The reason is that when the state information is not received from the first processor, because no position change of the electronic device exists while the second processor is in a sleep state, consuming power of the electronic device by waking up the second processor in the sleep state is unnecessary. If the state information is not received from the first processor, the second processor 402 is not required to measure a position by using the position measuring module connected to the second processor when the second processor is in a wake-up state, (e.g., it is unnecessary to waste power).

If the state information is received from the first processor, the second processor may confirm the next position measuring period for starting to measure a position by using the position measuring module. Thereafter, the second processor may measure a changed position by using the position measuring module at the next position measuring period.

Moreover, the second processor may read the state information from the first processor and may confirm the read state information when the next position measuring period arrives. The reason is that an operation for reading updated state information from the first processor consumes less power than an operation for directly receiving state information from the first processor, by the second processor, when the next position measuring period arrives.

Additionally, if the second processor determines to measure a changed position, the second processor may measure the changed position by using the position measuring module at the next position measuring period among set periods.

The position measuring module may measure a position of the electronic device under control of the second processor. The position measuring module may use a measurement method of Global Navigation Satellite System (GNSS) including GPS, Global Navigation Satellite System (GLONASS), Beidou, Galileo, Quasi-Zenith Satellite System (QZSS), and/or the like. Additionally or alternatively, the position measuring module may use a measurement method such as WIFI Positioning System (WPS), Cell Positioning, Observed Time Difference Of Arrival (OTDOA), and/or the like. Additionally or alternatively, the position measuring module may use a measurement method of Fingerprinting Solution based on a Radio Map or an Access Point (AP) list, and/or the like. Additionally or alternatively, the position measuring module may use a measurement method of a tagging based Proximity Solution using NFC, Radio Frequency Identification (RFID), Bluetooth Low Energy (BLE), and/or the like.

As mentioned above, if a set condition is satisfied after a state change of the electronic device is determined, the first processor of the electronic device may measure a changed position of the electronic device. Therefore, the current consumption of the electronic device may be reduced.

Figure 4:
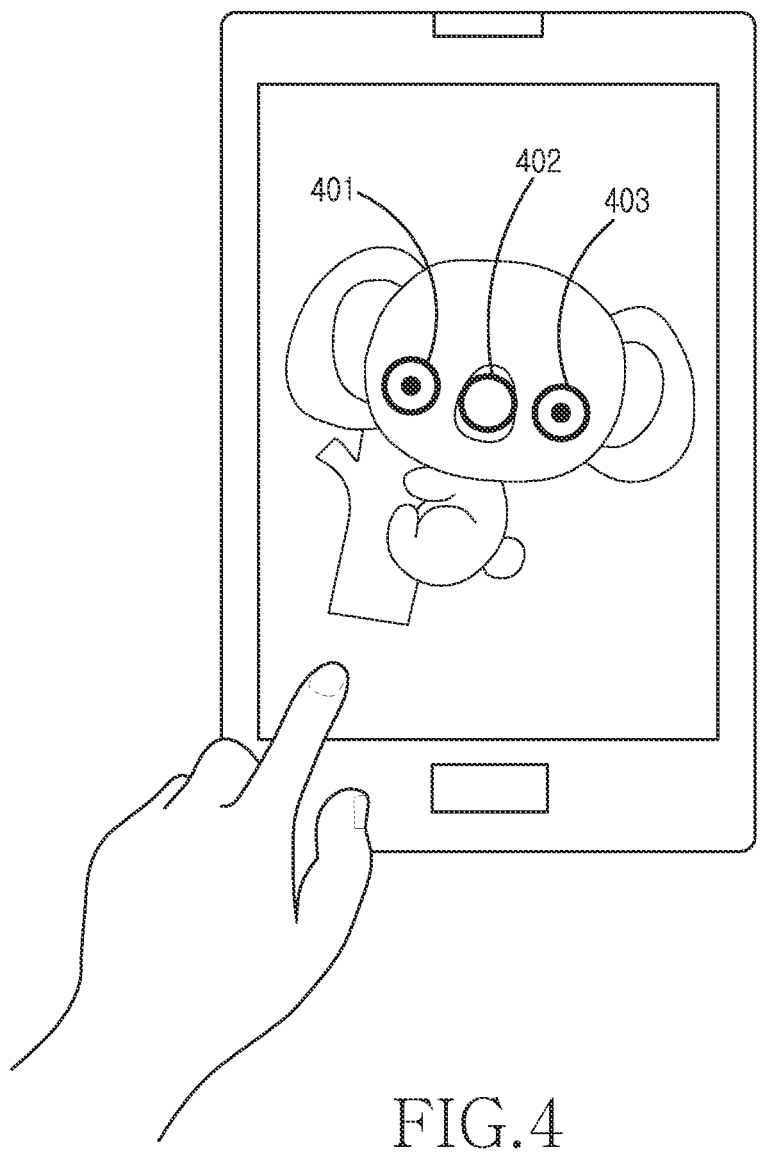
FIG. 4 is a view of generating a key code after a message is input to a displayed image according to an embodiment of the present disclosure.

FIG. 4 is a view of generating a key code after a message is input to a displayed image according to an embodiment of the present disclosure.

Referring to FIG. 4, according to various embodiments of the present disclosure, an electronic device may receive text information. More specifically, the electronic device may receive text information to be inserted into an image (e.g., important information to be inserted into an image). For example, when a password that a user uses for a bank A is "1234", the electronic device may receive "12345", the password of the bank A.

Thereafter, in order to insert the inputted text information into a displayed image, the electronic device may receive at least one area from among areas of the displayed image. For example, in order to encrypt the inputted text information, the electronic device may receive a selection on at least one area from among areas of the displayed image.

For example, as illustrated in FIG. 4, an example in which the electronic device receives a touch input in the order of the right eye 401, the nose 402, and the left eye 403 of a koala displayed on a touch screen is described.

According to various embodiments of the present disclosure, using the above example, when receiving a selection on the right eye 401 of the koala for the first selection time, the electronic device reads a set coordinate value corresponding to the right eye 401 of the koala in an area of a touch screen and simultaneously reads a set sequence value representing that the right eye 401 is selected first. In the same manner, when receiving a selection on the nose 402 of the koala for the second selection time, the electronic device reads a set coordinate value corresponding to the nose 402 of the koala in an area of a touch screen and simultaneously reads a set sequence value representing that the nose 402 is selected second. In the same manner, when receiving a selection on the left eye 403 of the koala for the third selection time, the electronic device reads a set coordinate value corresponding to the left eye 403 of the koala in an area of a touch screen and simultaneously reads a set sequence value representing that the left eye 403 is selected third.

Thereafter, the electronic device may generate a key code in a set format according to an area and order that the displayed image is selected. For example, if a set coordinate value corresponding to the right eye 401 of the koala is 57, a set coordinate value corresponding to the nose 402 of the koala is 69, a set coordinate value corresponding to the left eye 403 of the koala is 81, a set sequence value is 59 when a selection is made first, a set sequence value is 38 when a selection is made second, and a set sequence value is 50 when a selection is made third is described.

According to various embodiments of the present disclosure, using the above example, if the electronic device is set to generate a key code by combining each of the coordinate values and the sequence orders, the electronic device may generate 57 and 59 (e.g., key codes corresponding to the first input), 69 and 38 (e.g., key codes corresponding to the second input), or 81 and 50 (e.g., key codes corresponding to the third input). For example, the electronic device may generate key codes 57, 59, 69, 38, 81, and 50 finally by combining the generated key codes.

According to various embodiments of the present disclosure, if the electronic device is set to generate a key code by sequentially combining each of the coordinate values and the sequence orders, the electronic device may generate key codes 57, 69, 81, 59, 38, and 50 finally.

Thereafter, the electronic device may additionally perform an operation for adjusting a bit size to allow the generated key code to be appropriately used for an encryption algorithm. More specifically, the electronic device may use the generated key code in the current state of the generated key code or may adjust a bit size and then use adjusted key code. According to various embodiments of the present disclosure, the electronic device may use the generated key codes 57, 59, 69, 38, 81, and 50 in the current state of the key code or may generate a key code in a format such as "0X21F5" in which a bit size is adjusted to allow the generated key code to be appropriately used for an encryption algorithm.

Figure 5:
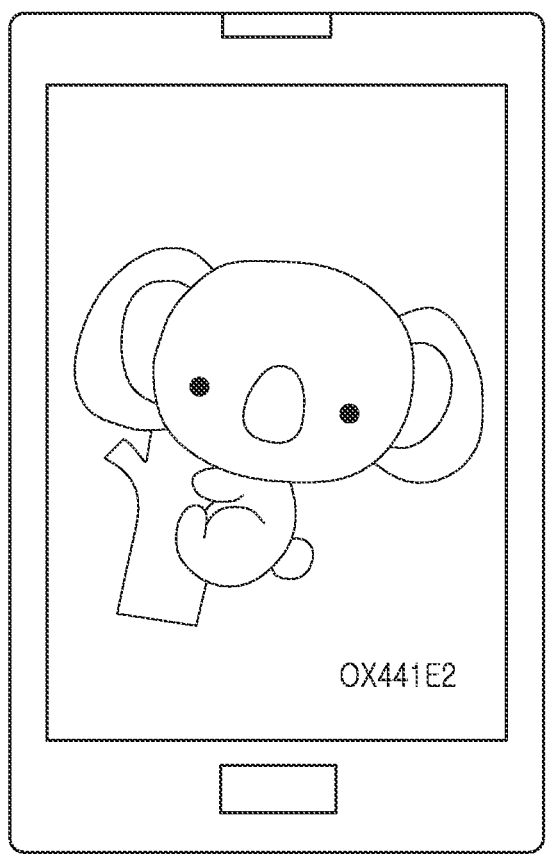
FIG. 5 is a view of inserting a message into a displayed image in an electronic device according to an embodiment of the present disclosure.

FIG. 5 is a view of inserting a message into a displayed image in an electronic device according to an embodiment of the present disclosure.

Referring to FIG. 5, according to various embodiments of the present disclosure, the electronic device may generate an encrypted message from the inputted text information and generated key code by using a set encryption algorithm. More specifically, the electronic device may generate an encrypted message from the inputted text information and generated key code by using a set encryption algorithm.

For example, if the text information inputted from the electronic device is information "A bank 1234" and a key code generated according to a coordinate and order of a selected area is "0X21F5", the electronic device may generate an encrypted message "0X441E2" according to a set encryption algorithm.

According to various embodiments of the present disclosure, the scope of the encryption algorithm that the electronic device uses is not limited and a format of an encrypted message may vary according to a set encryption algorithm. For example, although the electronic device generates an encrypted message according to a set encryption algorithm, because text information to be encrypted regardless of a format of an encrypted message is an important issue, the present disclosure is not limited thereto.

Thereafter, the electronic device may simultaneously generate a hash code for inputted text information. For example, when confirming that an encrypted message "0X441E2" is generated according to a set encryption algorithm, the electronic device may simultaneously generate an arbitrary hash code "3AA2" for inputted text information.

Thereafter, the electronic device may insert an encryption message and hash code generated according to a set encryption algorithm, into a displayed image through watermark technique. For example, as illustrated in FIG. 5, the electronic device may convert the inputted text information "A bank 1234" into an arbitrary encrypted message "0X441E2" and insert the encrypted message at the bottom of the displayed image.

According to various embodiments of the present disclosure, although the encrypted message "0X441E2" is visible for the convenience of understanding to indicate that an encrypted message is inserted as illustrated in FIG. 5, because watermark technology is substantially used, the encrypted message may be invisible.

Figure 6B:
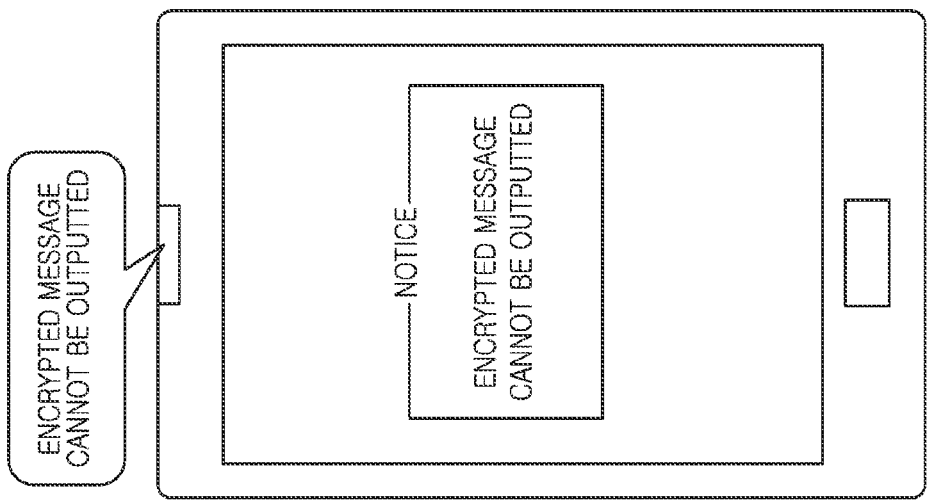
FIGS. 6A and 6B are views of blocking an encrypted message if an electronic device is determined to be unable to decrypt the encrypted message according to an embodiment of the present disclosure.
Figure 6A:
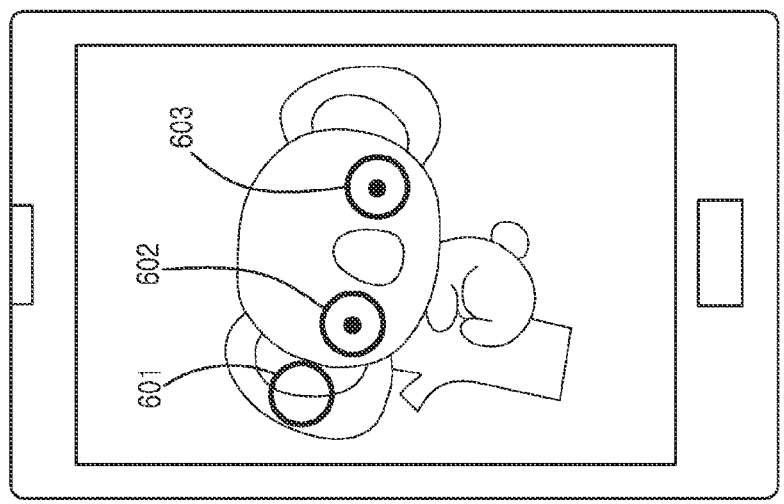

FIGS. 6A and 6B are views of blocking an encrypted message if an electronic device is determined to be unable to decrypt the encrypted message according to an embodiment of the present disclosure.

Referring to FIGS. 6A and 6B, the electronic device may display an image where an encrypted message is inserted on a touch screen thereof. More specifically, the electronic device may display the image in which an encrypted message is inserted and which is stored in the electronic device, or may receive an image in which an encrypted message is inserted from another electronic device and display the received image.

Thereafter, the electronic device may receive a selection on at least one area from among areas of the displayed image. For example, as illustrated in FIG. 6A, the electronic device may sequentially receive selections on the right ear

601 of the koala, the right eye 602 of the koala, and the left eye 603 of the koala from among areas of a displayed koala area.

Thereafter, the electronic device may generate a key code set according to the coordinates and selected order of at least one selected area from among areas of a displayed area. According to various embodiments of the present disclosure, using the example above, when receiving a selection on the right ear 601 of the koala for the first time, the electronic device reads a set coordinate value corresponding to the right ear 601 of the koala in an area of a touch screen and simultaneously reads a set sequence value representing that the right ear 601 is selected first. In the same manner, when receiving a selection on the right eye 602 of the koala for the second time, the electronic device reads a set coordinate value corresponding to the right eye 602 of the koala in an area of a touch screen and simultaneously reads a set sequence value representing that the right eye 602 is selected second. In the same manner, when receiving a selection on the left eye 603 of the koala for the third time, the electronic device reads a set coordinate value corresponding to the left eye 603 of the koala in an area of a touch screen and simultaneously reads a set sequence value representing that the left eye 603 is selected third.

Thereafter, the electronic device may generate a key code in a set format according to an area and order that the displayed image is selected. For example, the case that a set coordinate value corresponding to the right ear 601 of the koala is 1, a set coordinate value corresponding to the right eye 602 of the koala is 2, a set coordinate value corresponding to the left eye 603 of the koala is 3, a set sequence value is 4 when a selection is made first, a set sequence value is 5 when a selection is made second, and a set sequence value is 6 when a selection is made third is exemplarily described.

In the above embodiment, if the electronic device is set to generate a key code by combining each of the coordinate values and the sequence orders, the electronic device may generate 1 and 4 (e.g., key codes corresponding to the first input), 2 and 5 (e.g., key codes corresponding to the second input), or 3 and 6 (e.g., key codes corresponding to the third input). For example, the electronic device may generate key codes 1, 4, 2, 5, 3, and 6 finally by combining the generated key codes.

According to various embodiments of the present disclosure, if the electronic device is set to generate a key code by sequentially combining each of the coordinate values and the sequence orders, the electronic device may generate key codes 1, 2, 3, 4, 5, and 6 finally.

Thereafter, the electronic device may additionally perform an operation for adjusting a bit size to allow the generated key code to be appropriately used for a decryption algorithm. More specifically, the electronic device may use the generated key code in the current state of the key code or may adjust a bit size and then use adjusted key code.

Thereafter, the electronic device may decrypt the inserted encrypted message and the generated key code according to a set decryption algorithm. More specifically, the electronic device may receive an encrypted message inserted into an image and a selection on an area of a displayed image and then decrypt the encrypted message through a decryption algorithm set using a generated key code.

For example, if an encrypted message inserted into a displayed image is a message "441E2" and a key code generated according to the coordinate and order of a selected area is "0X13A2", the electronic device may decrypt the encrypted message "441E2" as a message "Df3qeqe ㅂ ㄷ" according to a set decryption algorithm.

Thereafter, the electronic device generates a hash code for the decrypted message and then determines whether the generated hash code is identical to a hash code for text information inserted into an image. According to various embodiments of the present disclosure, using the example above, the electronic device may generate a hash code for the decrypted message "Df3qeqe ㅂ ㄷ" and then may determine whether the generated hash code is identical to a hash code for an input text inserted together with the encrypted message.

If the hash code for text information is determined not to be identical to the hash code for the decrypted message, the electronic device may display a message (e.g., a notification) that the encrypted message cannot be outputted or output the message (e.g., the notification) as voice. For example, as illustrated in FIG. 6B, if the hash code for text information is determined not to be identical to the hash code for the decrypted message, the electronic device may display an guide message that the "encrypted message cannot be outputted" on a touch screen of the electronic device or output the guide message as voice through a speaker.

Figure 7B:
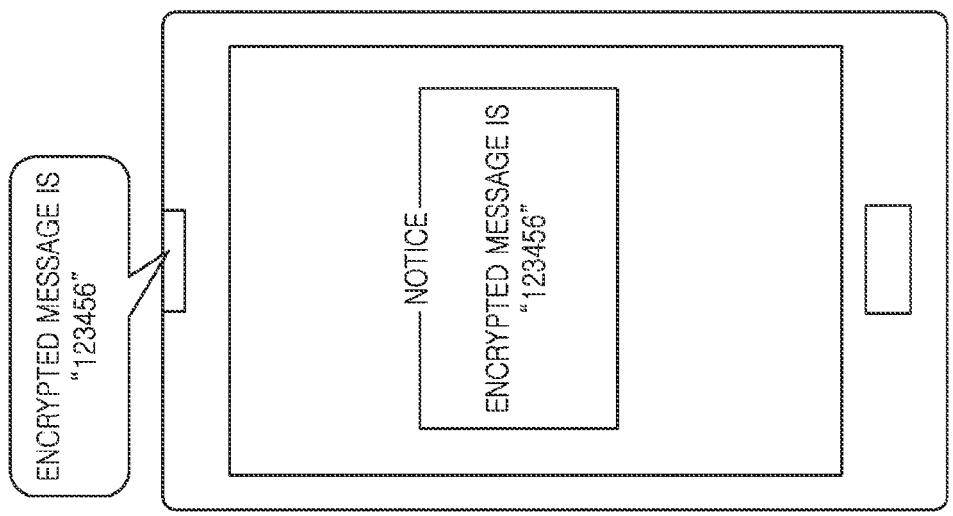
FIGS. 7A and 7B are views of decrypting an encrypted message in an electronic device according to an embodiment of the present disclosure.
Figure 7A:
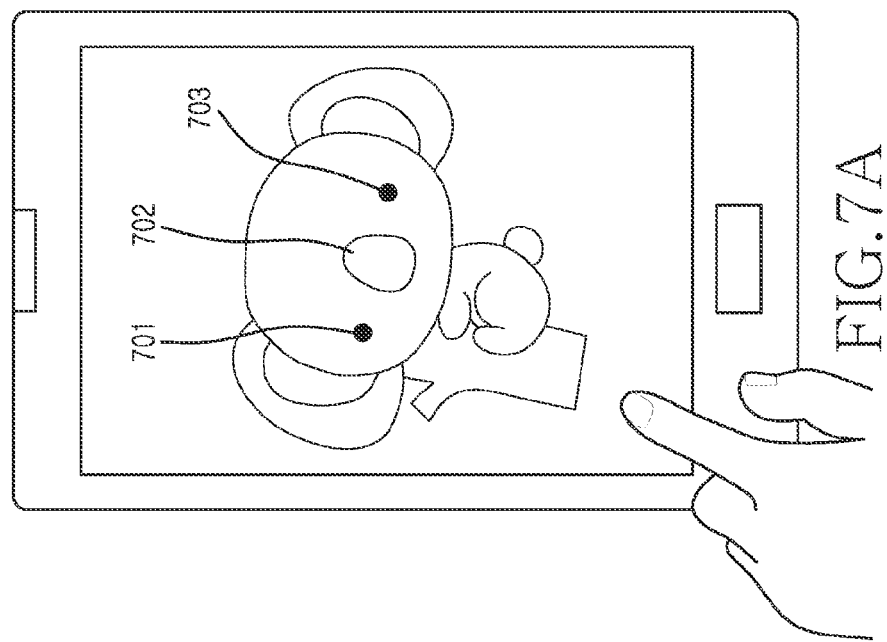

FIGS. 7A and 7B are views of decrypting an encrypted message in an electronic device according to an embodiment of the present disclosure.

Referring to FIG. 7A, the electronic device may receive a selection on at least one area from among areas of a displayed image. For example, as illustrated in FIG. 7A, the electronic device may sequentially receive selections on the right eye 701 of the koala, the nose 702 of the koala, and the left eye 703 of the koala from among areas of a displayed koala area.

Thereafter, the electronic device may generate a key code set according to the coordinates and selected order of at least one selected area from among the areas of the displayed area. According to various embodiments of the present disclosure, when receiving a selection on the right eye 701 of the koala for the first selection time, the electronic device reads a set coordinate value corresponding to the right eye 701 of the koala in an area of a touch screen and simultaneously reads a set sequence value representing that the right eye 701 is selected first. In the same manner, when receiving a selection on the nose 702 of the koala for the second selection time, the electronic device reads a set coordinate value corresponding to the nose 703 of the koala in an area of a touch screen and simultaneously reads a set sequence value representing that the nose 702 is selected second. In the same manner, when receiving a selection on the left eye 703 of the koala for the third selection time, the electronic device reads a set coordinate value corresponding to the left eye 703 of the koala in an area of a touch screen and simultaneously reads a set sequence value representing that the left eye 703 is selected third.

Thereafter, the electronic device may generate a key code in a set format according to an area and order that the displayed image is selected. For example, the case that a set coordinate value corresponding to the right eye 701 of the koala is 10, a set coordinate value corresponding to the nose 702 of the koala is 20, a set coordinate value corresponding to the left eye 703 of the koala is 30, a set sequence value is 40 when a selection is made first, a set sequence value is 50 when a selection is made second, and a set sequence value is 60 when a selection is made third is exemplarily described.

According to various embodiments of the present disclosure, using the example above, if the electronic device is set to generate a key code by combining each of the coordinate values and the sequence orders, the electronic device may generate 10 and 40 (e.g., key codes corresponding to the first input), 20 and 50 (e.g., key codes corresponding to the second input), or 30 and 60 (e.g., key codes corresponding to the third input). For example, the electronic device may generate key codes 10, 40, 20, 50, 30, and 60 finally by combining the generated key codes.

According to various embodiments of the present disclosure, using the example above, if the electronic device is set to generate a key code by sequentially combining each of the coordinate values and the sequence orders, the electronic device may generate key codes 10, 20, 30, 40, 50, and 60 finally.

Additionally, the electronic device may perform an operation for adjusting a bit size to allow the generated key code to be appropriately used for a decryption algorithm. More specifically, the electronic device may use the generated key code in the current state of the generated key code or may adjust a bit size and then use adjusted key code.

Thereafter, the electronic device may decrypt the inserted encrypted message and the generated key code according to a set decryption algorithm. More specifically, the electronic device may receive an encrypted message inserted into an image and a selection on an area of a displayed image and then decrypt the encrypted message through a decryption algorithm set using a generated key code.

For example, if an encrypted message inserted into a displayed image is a message "441E2" and a key code generated according to the coordinate and order of a selected area is "0X21F5", the electronic device may decrypt the encrypted message "441E2" as a message "123456" according to a set decryption algorithm.

Thereafter, the electronic device generates a hash code for the decrypted message and then determines whether the generated hash code is identical to a hash code for text information inserted into an image. According to various embodiments of the present disclosure, using the example above, the electronic device may generate a hash code for the decrypted message "123456" and then may determine whether the generated hash code is identical to a hash code for an input text inserted together with the encrypted message.

If the hash code for text information is determined not to be identical to the hash code for the decrypted message, the electronic device may display a decrypted message or output the decrypted message as voice. For example, as illustrated in FIG. 7B, if the hash code for text information is determined not to be identical to the hash code for the decrypted message, the electronic device may display a notification message that the "encrypted message is 123456" on a touch screen of the electronic device or output the notification message as voice through a speaker.

FIGS. 8A, 8B and 8C are views of displaying a portion selected when a displayed image is selected through an electronic device according to an embodiment of the present disclosure.

Referring to FIGS. 8A, 8B, and 8C, the electronic device may encrypt a text inputted by selecting at least one area from among areas of a displayed image or may decrypt an encrypted message. More specifically, in order to decrypt an encrypted message after an arbitrary area is sequentially selected to encrypt an initially-selected text, the electronic device should receive an initially-selected area sequentially in order for normal decryption.

Accordingly, when a displayed image is selected for encryption and decryption, the electronic device may display a selected area. For example, if the right eye of the koala, the nose of the koala, and the left eye of the koala are sequentially selected from the image of the koala displayed on a touch screen of the electronic device, the electronic device may display the selected areas.

For example, as illustrated in FIGS. 8A to 8C, if the right eye of the koala, the nose of the koala, and the left eye of the koala are sequentially selected from the image of the koala displayed on the touch screen of the electronic device, the electronic device may display the selected areas of the koala according to a set size and shape. The reason for displaying the selected areas according to a set size and shape is that in order to decrypt an encrypted message after an arbitrary area is sequentially selected to encrypt an initially-selected text, the electronic device should receive an initially-selected area sequentially in order for normal decryption. Accordingly, because an area that a user selects from a displayed image is displayed according to a set size and shape, the user may confirm a touch area by the naked area.

Figure 9:
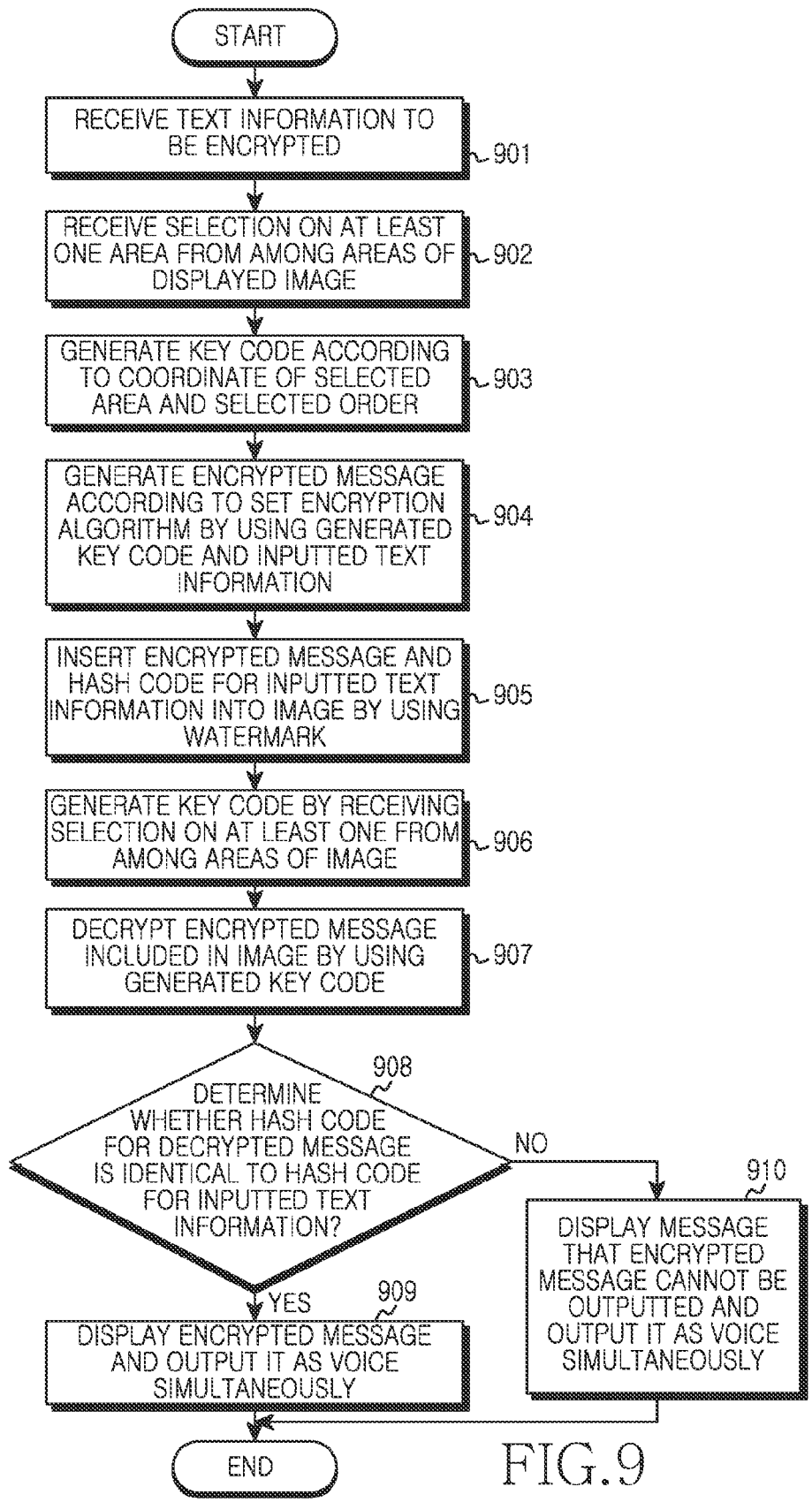
FIG. 9 is a flowchart illustrating an operation order of an electronic device extracting an encrypted message from an image according to an embodiment of the present disclosure.

FIG. 9 is a flowchart illustrating an operation order of an electronic device extracting an encrypted message from an image according to an embodiment of the present disclosure.

Referring to FIG. 9, at operation 901, the electronic device receives text information to be encrypted. For example, if a user inserts a password "1234" for a bank A into a specific image, the electronic device may receive text information "1234".

Thereafter, at operation 902, the electronic device may receive a selection on at least one area from among areas of a displayed image. For example, in order to encrypt the inputted text information, the electronic device may receive a selection on at least one area from among areas of a displayed image.

Thereafter, at operation 903, the electronic device generates a key code according to the coordinate and order of the selected area. For example, the case that a set coordinate value corresponding to the right ear of the koala is 1, a set coordinate value corresponding to the right eye of the koala is 2, a set coordinate value corresponding to the left eye of the koala is 3, a set sequence value is 4 when a selection is made first, a set sequence value is 5 when a selection is made second, and a set sequence value is 6 when a selection is made third is exemplarily described. According to various embodiments of the present disclosure, using the example above, if the electronic device is set to generate a key code by combining each of the coordinate values and the sequence orders, the electronic device may generate 1 and 4 (e.g., key codes corresponding to the first input), 2 and 5 (e.g., key codes corresponding to the second input), or 3 and 6 (e.g., key codes corresponding to the third input). For example, the electronic device may generate key codes 1, 4, 2, 5, 3, and 6 finally by combining the generated key codes.

Thereafter, at operation 904, the electronic device generates an encrypted message according to a set encryption algorithm by using the generated key code and the inputted text information. The scope of the encryption algorithm that the electronic device uses is not limited and a format of an encrypted message may vary according to a set encryption algorithm. For example, although the electronic device generates an encrypted message according to a set encryption algorithm, because text information to be encrypted regardless of a format of an encrypted message is an important issue, various embodiments of the present disclosure are not limited thereto.

Thereafter, at operation 905, the electronic device inserts the encrypted message and a hash code for the inputted text information into an image through watermark. Accordingly, even when the image displayed by the electronic device is open to a third party, the third party may not recognize the encrypted message inserted through watermark technology.

Thereafter, at operation 906, the electronic device generates a key code by selecting at least one area from among the areas of the image. According to various embodiments of the present disclosure, the operation for generating a key code by the electronic device may be identical to operation 903.

Thereafter, at operation 907, the electronic device decrypts the encrypted message included in the image by using the generated key code. More specifically, the electronic device may receive an encrypted message inserted into an image and a selection on an area of a displayed image, and then decrypt the encrypted message through a decryption algorithm set using a generated key code.

Thereafter, at operation 908, the electronic device determines whether a hash code for the decrypted message is identical to a hash code for the inputted text information. More specifically, the electronic device may insert a hash code for an inputted text and an encrypted message into an image during an encryption operation and then may determine whether the hash code for the inputted text is identical to a hash code for a decrypted message.

If the electronic device determines that the hash code for the inputted text is identical to the hash code for the decrypted message at operation 908, then the electronic device may proceed to operation 909 at which the electronic device provides a notification of the encrypted message. For example, the electronic device may display the encrypted message. As another example, the electronic device may output the encrypted message as voice (e.g., through a speaker). As another example, the electronic device may display the encrypted message and outputs the encrypted message as voice simultaneously. For example, the electronic device may display a notification message that "encrypted message is OOO" on a touch screen of the electronic device and output the notification message as voice through a speaker.

In contrast, if the electronic device determines that the hash code for the inputted text is not identical to the hash code for the decrypted message at operation 908, then the electronic device may proceed to operation 910 at which the electronic device may display a message that the encrypted message cannot be outputted. As another example, the electronic device may output the message that the encrypted message cannot be outputted, as voice (e.g., through a speaker). As another example, the electronic device may display a message that the encrypted message cannot be outputted and outputs the encrypted message as voice simultaneously. For example, the electronic device may display a notification message that "encrypted message cannot be outputted" on a touch screen of the electronic device and outputs the notification message as voice through a speaker.

Figure 10:
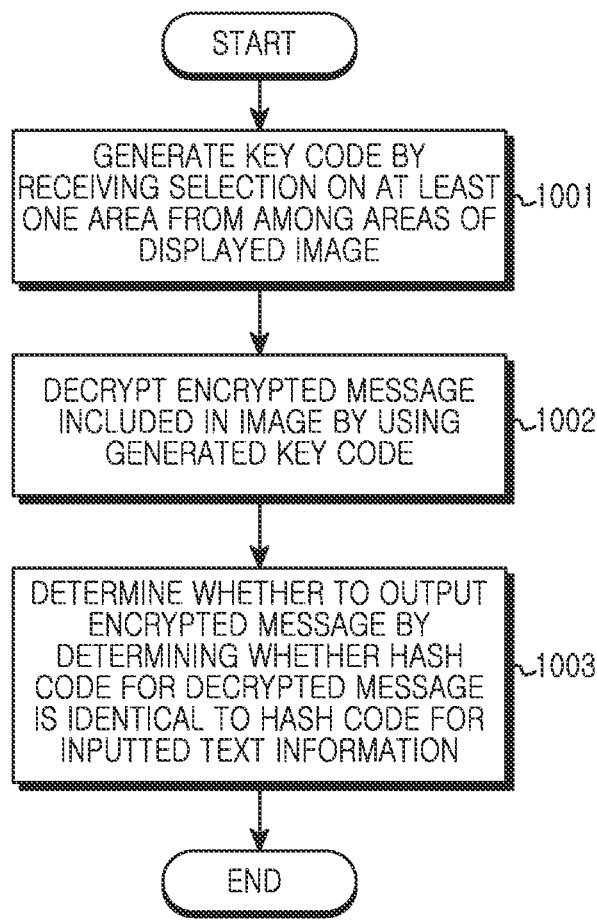
FIG. 10 is a flowchart illustrating a method of an electronic device to extract an encrypted message from an image file according to an embodiment of the present disclosure.

FIG. 10 is a flowchart illustrating a method of an electronic device to extract an encrypted message from an image file according to an embodiment of the present disclosure.

Referring to FIG. 10, at operation 1001, the electronic device generates a key code by selecting at least one area from among areas of a displayed image. For example, the case that a set coordinate value corresponding to the right ear of the koala is 10, a set coordinate value corresponding to the right eye of the koala is 20, a set coordinate value corresponding to the left eye of the koala is 30, a set sequence value is 40 when a selection is made first, a set sequence value is 50 when a selection is made second, and a set sequence value is 60 when a selection is made third is exemplarily described. According to various embodiments of the present disclosure, using the example above, if the electronic device is set to generate a key code by combining each of the coordinate values and the sequence orders, the electronic device may generate 10 and 40 (e.g., key codes corresponding to the first input), 20 and 50 (e.g., key codes corresponding to the second input), or 30 and 60 (e.g., key codes corresponding to the third input). For example, the electronic device may generate key codes 10, 40, 20, 50, 30, and 60 finally by combining the generated key codes.

Thereafter, at operation 1002, the electronic device decrypts the encrypted message included in the image by using the generated key code. More specifically, the electronic device may receive an encrypted message inserted into an image and a selection on an area of a displayed image and then decrypt the encrypted message through a decryption algorithm set using a generated key code.

Thereafter, at operation 1003, the electronic device determines whether a hash code for the decrypted message is identical to a hash code for the inputted text information so as to determine whether to output the encrypted message. Thereafter, if the hash code for the decrypted message is determined to be identical to the hash code for the inputted text information, the electronic device displays the encrypted message and outputs the encrypted message as voice simultaneously. However, if the hash code for the decrypted message is determined not to be identical to the hash code for the inputted text information, the electronic device displays a message that the encrypted message cannot be outputted and outputs the message as voice simultaneously.

It will be appreciated that various embodiments of the present disclosure according to the claims and description in the specification can be realized in the form of hardware, software or a combination of hardware and software. Any such software may be stored in a non-transient computer readable storage medium. The non-transient computer readable storage medium stores one or more programs (software modules), the one or more programs comprising instructions, which when executed by one or more processors in an electronic device, cause the electronic device to perform a method of the present disclosure. Any such software may be stored in the form of volatile or non-volatile storage such as, for example, a storage device like a ROM, whether erasable or rewritable or not, or in the form of memory such as, for example, RAM, memory chips, device or integrated circuits or on an optically or magnetically readable medium such as, for example, a CD, DVD, magnetic disk or magnetic tape or the like. It will be appreciated that the storage devices and storage media are various embodiments of machine-readable storage that are suitable for storing a program or programs comprising instructions that, when executed, implement various embodiments of the present disclosure. Accordingly, various embodiments provide a program comprising code for implementing apparatus or a method as claimed in any one of the claims of this specification and a machine-readable storage storing such a program. Still further, such programs may be conveyed electronically via any medium such as a communication signal carried over a wired or wireless connection and various embodiments suitably encompass the same.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method in an electronic device, the method comprising:
   displaying a first image including a first encrypted message and a first hash code;
   receiving a selection of at least two areas from among a plurality of areas of the displayed first image;
   reading coordinate values corresponding to the selected at least two areas;
   generating a first key code for decrypting the first encrypted message based on the coordinate values corresponding to the selected at least two areas and a selected order of the selected at least two areas;
   decrypting the first encrypted message by using the first key code;
   generating a second hash code for the decrypted message; and
   determining whether to output the decrypted message by determining whether the second hash code is identical to the first hash code.

2. The method of claim 1, further comprising:
   displaying a second image;
   receiving text information;
   receiving a selection of at least two areas from among a plurality of areas of the second image;
   reading coordinate values corresponding to the selected at least two areas of the second image;
   generating a second key code for encrypting the received text information based on the coordinate values corresponding to the selected at least two areas of the second image and a selected order of the selected at least two areas of the second image;
   generating a second encrypted message by encrypting the received text information using the second key code;
   generating a third hash code for the received text information; and
   inserting the second encrypted message and the third hash code into the second image through a watermark.

3. The method of claim 1, wherein the determining whether to output the encrypted message comprises:
   when the second hash code is not identical to the first hash code, displaying a message that the encrypted message cannot be displayed.

4. The method of claim 1, wherein the determining whether to output the encrypted message comprises:
   when the second hash code is not identical to the first hash code, outputting a message that the encrypted message cannot be outputted as voice.

5. The method of claim 1, wherein the determining of whether to output the encrypted message comprises:
   when the second hash code is identical to the first hash code, displaying the decrypted message.

6. The method of claim 1, wherein the determining of whether to output the encrypted message comprises:
   when the second hash code is identical to the first hash code, outputting the decrypted message as voice.

7. An electronic device comprising:
   a display module;
   a processor configured to:
      display a first image including a first encrypted message and a first hash code on the display module,
      receive a selection of at least two areas from among a plurality of areas of the displayed first image,
      read coordinate values corresponding to the selected at least two areas;
      generate a first key code for decrypting the first encrypted message based on the coordinate values corresponding to the at least two areas and a selected order of the at least two areas,
      decrypt the first encrypted message by using the first key code,
      generate a second hash code for the decrypted message, and
      determine whether to output the decrypted message by determining whether the second hash code is identical to the first hash code; and
   a memory configured to store data controlled by the processor.

8. The device of claim 7,
   wherein the display module is further configured to display a second image, and
   wherein the processor is further configured to:
      receive text information,
      receive a selection of at least two areas from among a plurality of areas of the second image,
      read coordinate values corresponding to the selected at least two areas of the second image,
      generate a second key code for encrypting the received text information according to the coordinate values corresponding to the selected at least two areas of the second image and a selected order of the selected at least two areas of the second image,
      generate a second encrypted message by encrypting the received text information using the second key code,
      generate a third hash code for the received text information, and
      insert the second encrypted message and the third hash code into the second image through a watermark.

9. The device of claim 7, wherein the processor is further configured to operatively control the display module to display a message that the encrypted message cannot be outputted if the processor determines that the second hash code is not identical to the first hash code.

10. The device of claim 7, further comprising:
    a speaker,
    wherein the processor is further configured to operatively control the speaker to output a message that the encrypted message cannot be outputted as voice if the processor determines that the second hash code is not identical to the first hash code.

11. The device of claim 7,
    wherein the processor is further configured to operatively control the display module to display the decrypted message if the processor determines that the second hash code is identical to the first hash code.

12. The device of claim 7, further comprising:
    a speaker,
    wherein the processor is further configured to operatively control the speaker to output the decrypted message as voice if the processor determines that the second hash code is identical to the first hash code.

* * * * *